(12) United States Patent
Leong

(10) Patent No.: US 6,180,147 B1
(45) Date of Patent: *Jan. 30, 2001

(54) SEMI-ARTIFICIAL MONARCH BUTTERFLY LARVAL DIET

(75) Inventor: Kingston L. H. Leong, San Luis Obispo, CA (US)

(73) Assignee: California Polytechnic State University Foundation, San Luis Obispo, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/215,050

(22) Filed: Dec. 17, 1998

(51) Int. Cl.⁷ .................................................. A23K 1/00
(52) U.S. Cl. ........................ 426/335; 426/72; 426/622; 426/630; 426/635
(58) Field of Search ................................ 426/635, 622, 426/630, 335, 72

(56) References Cited

U.S. PATENT DOCUMENTS 3,295,983 * 1/1967 Kato et al. .............................. 99/2
4,770,878 * 9/1988 Thomas ................................. 424/141

FOREIGN PATENT DOCUMENTS 52-139741 * 11/1977 (JP).

OTHER PUBLICATIONS

Jones et al., J. Econ. Entomol., vol. 79(2), pp. 323–328, 1986.*

Karilmoto et al., Ann. Entomol. Fenn., vol. 42(2), pp. 91–97, 1976.*

Singh, et al., "A note on rearing of the monarch butterfly, *Danaus plexippus* (L.), on an artficial diet," *New Zealand Entomologist*, vol. II, pp. 73–75 (1988).

* cited by examiner

*Primary Examiner*—Chhaya D. Sayala
(74) *Attorney, Agent, or Firm*—Terrence W. McMillin

(57) ABSTRACT

A semi-artificial diet of monarch butterfly larva and a process for making such a diet are provided. The diet consists of a substantial amount of dried milkweed powder and small but effective amounts of mold inhibitor and antibiotic.

10 Claims, No Drawings

SEMI-ARTIFICIAL MONARCH BUTTERFLY LARVAL DIET

FIELD OF THE INVENTION

This invention relates to a semi-artificial diet for monarch butterfly larva and a process for making such a diet.

BACKGROUND OF THE INVENTION

The monarch butterfly is one of the most well-recognized animals and has generated much interest because of its beauty and its migratory habits. Recently, monarch butterflies have become popular for release at weddings, graduations and other celebrations and events. Based on the demand, a commercial market in monarch butterflies has developed and commercial monarch butterfly suppliers and farms now exist.

Interest in raising monarch butterflies has also been spurred by concern for destruction of their natural habits and other environmental concerns affecting monarch butterflies. Also, interest exists in raising monarch butterflies for educational purposes or by hobbyists or simply by people who enjoy watching and studying these beautiful animals.

One factor which has limited the ability to raise monarchs in captivity has been the need for monarch butterfly larva to feed on milkweed plants. Monarch butterflies larva feed exclusively on milkweed. Thus, it has been necessary to raise milkweed all year long or to otherwise have a constant supply of fresh milkweed in order to cultivate monarch butterflies. However, doing so is difficult and expensive.

Attempts have been made to develop artificial or semi-artificial diets for monarch butterfly larva but none have been entirely satisfactory. The monarchs raised using these artificial diets have either not developed properly or have been small and lacking in normal coloration. A need therefore exists for a monarch butterfly larval diet that can be used to raise healthy, normal monarch butterflies on a continuous and year round basis, is inexpensive, can be easily made and can be conveniently stored for long periods.

BRIEF SUMMARY OF THE INVENTION

This invention provides a diet or food for monarch butterfly larva which includes as its major constituent milkweed powder. The diet or food also includes sugar, protein, wheat germ, cellulose, texturizing agent, salt and ascorbic acid. It is preferred that the diet or food also include mold inhibitor and antibiotic.

In preferred embodiments, the sugar is sucrose, the protein is casein and the texturizing agent is agar. The preferred mold inhibitor is a mixture of propionic acid and phosphoric acid, but other inhibitors such as sodium benzoate may also be used. The preferred antibiotic is chlorotetracycline, but other antibiotics can be used.

The invention also provides a process for the preparation of dried milkweed powder. Milkweed leaves and shoots are sun dried on a screen for about 2 to 3 days. The milkweed leaves are then further dried in a dehydrator at about 120° F. for about 48 hours. The dried shoots and leaves are then ground into a powder.

The ground milkweed powder may then be used in a diet by mixing it with the other components of the diet and water to obtain a paste or dough like consistency. In this form, the diet may be easily stored, handled and dispensed.

DETAILED DESCRIPTION OF ILLUSTRATIVE EMBODIMENT

The larval diet of the present invention can be used to provide the entire food requirements for monarch butterfly larva. It is possible to sustain colonies of monarch butterflies year round and for repeated generations using this diet. Monarch butterflies raised on this diet are healthy and have natural coloration. This diet is relatively inexpensive, can be easily made and can be conveniently stored for long periods of time.

The diet of the present invention in its preferred and simplest form may consist of a mixture of all the ingredients into a single food. This is of course not necessary as long as the diet provided to the monarch butterfly larva includes all the constituents of a healthy diet. The diet or food may of course include other constituents as long as they do not significantly harm the monarch butterfly larva or interfere with the intake of a proper diet.

In order to prepare the diet or food, it is preferable to use a ground milkweed powder. The milkweed powder can be prepared from the shoots and leaves of various species of milkweeds. The native narrow leaf milkweed (*Asclepias fascicularis*), the Blood flower milkweed (*Asclepias curassavica* L.), and the Crown flower milkweed (*Calotropis gigantea* L.) have each been used in a semi-artificial diet to successfully rear monarch butterfly caterpillars to the adult stage.

The milkweed leaves and shoots are first sun dried on screens for 2 to 3 days. The purpose of this step is to reduce the moisture content of the milkweed in an inexpensive and easy way without the need for sophisticated equipment or the input of energy. A gentle sun drying also has been found to have no adverse effect on the milkweed which might result from more aggressive drying methods.

The sun drying time may have been adjusted depending on the season and the weather. And, of course, it is possible to substitute other available methods for reducing the moisture content of the milkweed as long as no substantial harm to the milkweed results.

The sun dried leaves and shoots are dried further in a dehydrator at 120° F. for 48 hours. The time and temperature used in this step may also have to be adjusted depending on the particular dehydrator used and the moisture content of the milkweed.

The dried milkweed is ground to a powder. A Wiley grinding mill, mesh size IEC 30559 has been successfully used to grind milkweed. The ground milkweed powder can be stored under refrigeration in plastic bags for up to six months or more.

A preferred formula for a semi-artificial monarch butterfly larva diet includes the following:

| Ingredient | Amount (grams) |
| --- | --- |
| Dried Milkweed Powder | 320 |
| Wheat Germ | 40 |
| Sucrose | 18 |
| Casein | 12 |
| Cellulose | 10 |
| Agar (plain) | 8 |
| Ascorbic Acid | 2 |
| Salt mixture (Wesson modification) | 2 |

The dry ingredients are mixed until a substantially uniform mixture is obtained. Approximately 1800 milliliters (ml) of water containing 5 ml of a mold inhibitor is added to the dry ingredients. The mold inhibitor consists of 41.8 ml of propionic acid and 4.2 ml of phosphoric acid and 54.0 ml of water.

The water and dry ingredients are mixed until substantially uniform. This mixture is autoclaved for 40 to 60 minutes in order to sterilize the mixture.

The autoclaved mixture is cooled to room temperature. After the mixture is cooled, 0.5 milligrams (mg) of chlorotetracycline dissolved in 250 ml of sterile water are added to the mixture.

The milkweed diet can be packaged in order to facilitate later use in plastic pastry dispensers, such as used for cake decorating, or in toothpaste tubes. The milkweed diet may be stored in a refrigerator or freezer.

Although an illustrative embodiment of the invention has been shown and described, it is to be understood that various modifications and substitutions may be made by those skilled in the art without departing from the novel spirit and scope of the present invention.

What is claimed is:

1. A diet for butterfly larva consisting of
   at least about 70% dried milkweed powder
   sugar;
   protein;
   wheat germ;
   cellulose;
   texturizing agent;
   salt;
   ascorbic acid;
   less than about 1% of a mold inhibitor; and
   less than about 1 part per million of an antibiotic.

2. The diet of claim 1 wherein the mold inhibitor comprises propionic acid and phosphoric acid.

3. The diet of claim 1 wherein the mold inhibitor comprises sodium benzoate.

4. The diet of claim 1 wherein the antibiotic comprises chlorotetracycline.

5. The diet of claim 1 wherein the sugar comprises sucrose.

6. The diet of claim 1 wherein the protein comprises casein.

7. The diet of claim 1 wherein the texturizing agent comprises agar.

8. A process for the preparation of dried milkweed powder consisting of sun drying milkweed leaves and shoots on screens for about 2 to 3 days, further drying the milkweed leaves and shoots in a dehydrator at about 120° F. for about 48 hours and grinding the dried milkweed leaves and shoots into a powder.

9. A process for the preparation of a food for butterfly larva consisting of preparing a food mixture comprising milkweed powder and which is capable of sustaining butterfly larva without any additional food; sterilizing the food mixture and adding an antibiotic.

10. The process of claim 9 wherein the food mixture is sterilized by autoclaving.

* * * * *